(12) United States Patent
Owdeh et al.

(10) Patent No.: US 10,422,279 B2
(45) Date of Patent: Sep. 24, 2019

(54) SPHERICAL COMPENSATOR JUNCTION ASSEMBLY FOR HIGH PRESSURE DUCTING SYSTEM

(71) Applicant: Senior IP GmbH, Shaffhausen (CH)

(72) Inventors: Muhannad Owdeh, Glendale, CA (US); Eric M. Possert, Pacoima, CA (US)

(73) Assignee: Senior IP GmbH, Schaffhausen (CH)

( * ) Notice: Subject to any disclaimer, the term of this patent is extended or adjusted under 35 U.S.C. 154(b) by 298 days.

(21) Appl. No.: 15/344,261

(22) Filed: Nov. 4, 2016

(65) Prior Publication Data

US 2018/0128170 A1 May 10, 2018

(51) Int. Cl.
| F16L 41/02 | (2006.01) |
| F02C 6/08 | (2006.01) |
| F04D 27/02 | (2006.01) |
| F16L 25/01 | (2006.01) |
| F16L 27/06 | (2006.01) |
| F16L 39/04 | (2006.01) |
| F16L 41/03 | (2006.01) |

(52) U.S. Cl.
CPC ............ *F02C 6/08* (2013.01); *F04D 27/0215* (2013.01); *F16L 25/01* (2013.01); *F16L 27/06* (2013.01); *F16L 39/04* (2013.01); *F16L 41/023* (2013.01); *F16L 41/03* (2013.01); *F05D 2260/60* (2013.01)

(58) Field of Classification Search
CPC ......... F16L 41/023; F16L 27/04; F16L 27/06; F16L 27/073
USPC .............................................. 285/263, 131.1
See application file for complete search history.

(56) References Cited

U.S. PATENT DOCUMENTS

| 685,876 A | * | 11/1901 | Shields ................... F16L 27/04 |
| | | | 285/125.1 |
| 1,745,683 A | * | 2/1930 | McDaniel ............. F16L 27/073 |
| | | | 285/271 |

(Continued)

FOREIGN PATENT DOCUMENTS

| CN | 203223690 A | 10/2013 |
| DE | 835091 C | * 3/1952 | .............. F16L 27/04 |

(Continued)

OTHER PUBLICATIONS

International Searching Authority, International Search Report, International Application No. PCT/EP2017/078192, Completed Jan. 26, 2018, 6 Pages.

(Continued)

*Primary Examiner* — David Bochna
(74) *Attorney, Agent, or Firm* — Greenberg Traurig, LLP

(57) ABSTRACT

A compensator junction assembly for carrying pressurized hot gases in an aircraft ducting system comprises a substantially spherical inner race having at least three apertures and at least three corresponding retainer assemblies, where the apertures in the retainer assemblies align with the apertures in the inner race, and at least three outer races, each having apertures generally aligned with the at least three inner race apertures, respectively. The retainer assemblies may include at least one bottom channel and at least one top channel for receiving one or more bearings and seals. Spherically rotational movement of the retainer assemblies between the inner and outer races accommodates stresses caused by the pressurized hot gases and external forces.

26 Claims, 8 Drawing Sheets

(56) References Cited

U.S. PATENT DOCUMENTS

| | | | | |
|---|---|---|---|---|
| 1,888,026 A | * | 11/1932 | Chapman | F16L 27/04 |
| | | | | 277/605 |
| 3,656,784 A | | 4/1972 | Dow et al. | |
| 3,799,586 A | * | 3/1974 | Caras | F16L 27/04 |
| | | | | 285/111 |
| 4,040,650 A | | 8/1977 | Shotbolt | |
| 4,071,269 A | * | 1/1978 | Halling | F16L 23/04 |
| | | | | 285/145.2 |
| 4,165,107 A | * | 8/1979 | Affa | F16L 27/073 |
| | | | | 285/226 |
| 4,772,033 A | * | 9/1988 | Nash | F02K 1/805 |
| | | | | 239/265.35 |
| 4,893,847 A | | 1/1990 | Hess | |
| 5,112,088 A | | 5/1992 | Moore et al. | |
| 5,125,226 A | | 6/1992 | Sperinck | |
| 5,149,147 A | | 9/1992 | Kastrup et al. | |
| 5,286,071 A | | 2/1994 | Storage | |
| 5,308,230 A | | 5/1994 | Moore | |
| 5,584,511 A | | 12/1996 | Gonzalez et al. | |
| 5,611,577 A | | 3/1997 | Meyer et al. | |
| 5,865,400 A | | 2/1999 | Pike et al. | |
| 6,003,814 A | | 12/1999 | Pike et al. | |
| 6,709,023 B2 | | 3/2004 | French | |
| 6,880,863 B2 | | 4/2005 | Vila | |
| 7,331,612 B2 | | 2/2008 | Frost et al. | |
| 8,844,976 B2 | | 9/2014 | Laubie | |
| 9,239,005 B2 | | 1/2016 | Strecker et al. | |
| 2010/0320752 A1 | | 12/2010 | Alstad | |
| 2015/0275758 A1 | | 10/2015 | Foutch et al. | |

FOREIGN PATENT DOCUMENTS

| | | |
|---|---|---|
| DE | 202011105647 U1 | 1/2012 |
| FR | 2407418 A2 | 4/1982 |
| FR | 2492944 A1 | 4/1982 |
| WO | 2015039081 A1 | 3/2015 |

OTHER PUBLICATIONS

International Searching Authority, International Application No. PCT/EP2017/078192, Written Opinion, Completed Jan. 26, 2018, 6 Pages.

* cited by examiner

SPHERICAL COMPENSATOR JUNCTION ASSEMBLY FOR HIGH PRESSURE DUCTING SYSTEM

FIELD OF THE INVENTION

This invention is related to the field of aerospace, and, in particular, to modern aircraft which utilize the flow of hot compressed gases to start aircraft engines, and which also utilize the flow of hot compressed bleed air from those engines for various on-board functions

BACKGROUND OF THE INVENTION

The present invention relates to the use of pneumatic ducting systems in aircraft structures. Amongst the prior art, it is well known to use high temperature, high pressure bleed air from the engines for various on-board purposes in a modern aircraft. It is also well known to use high temperature, high pressure gases to start aircraft engines.

Bleed air, or the high pressure hot air drawn from the aircraft engine's compressor stages, is routed through an aircraft to serve multiple purposes, including starting additional engines, pressurizing the cabin, de-icing the wings, nacelles, and empennage, and supporting the aircraft's air conditioning units, along with various other systems. The bleed air must therefore be transported from the engines to various other areas of the aircraft, using appropriate ducting systems, capable of withstanding high pressures, high temperatures, as well as the stresses of vibration, impact, acceleration, deceleration, aircraft component deflection and momentum. FIG. 1 depicts a high-level block diagram of a pneumatic ducting system for an aircraft, including the various potential components of the system, and the ducts that connect the components, for routing bleed air and other pressurized gases within the system. Such ducting systems typically utilize insulated metallic duct sections ranging in diameter from 1.00" to 6.50" and ranging in length from at least 6". The air in the duct can reach pressures up to 450 psig and reach temperatures of up to 1200° F., but is typically at a pressure of 60 psig and 800° F. in temperature.

The ducting systems are designed to expand and contract under thermal loading due to the flow of high temperature air. The ducting systems comprise numerous branches and junctions, to route the bleed air from the engines to the various systems and locations mentioned above. To account for thermal expansion, tolerances, and interface displacements due to the above-identified forces, a tension duct system (one where fluid column or longitudinal forces resulting from internal pressure are not transferred to the surrounding airplane structures, as defined in SAE ARP 699, ¶ 4.2.1) typically contains flexible joints that provide motion compensation. Such flexible joints are often used to connect two duct sections together, and are designed to relieve stresses and compensate for bending loads. SAE ARP 699 ¶ 5.1.2 defines the typical flex joint designs commonly used in modern aircraft.

The term "joint" is used herein to refer to a flexible motion compensator between two (and only two) duct sections, thereby enabling the pressurized gases within one duct portion to travel through the joint and into the next duct portion, wherein the two duct portions collectively form a single elongated duct section (containing a joint therewithin). In addition to such joints, aircraft ducting systems typically include one or more intersection points where a single duct portion can branch off into two or more duct portions, so that gases from the first duct portion can flow into multiple duct portions in different directions, to multiple locations throughout the aircraft. In the past, such intersection points have often comprised a three-way (or more) "junction," in which each of the duct sections may be connected to the junction via a standard, conventional flexible duct joint. Such standard duct joints enable movement between one duct portion and the junction—to accommodate rotation or translation due to thermal expansion, as well as all stresses or displacements that may arise from such highly pressurized, hot gases occurring in an accelerating or decelerating aircraft, complete with vibration, impacts and aircraft component deflection. Accordingly, the term "junction" is used herein to refer to a connection interface between three or more duct sections, thereby enabling the pressurized gases within one duct portion to travel through the junction and into multiple other duct portions, each of which carries the gases in a different direction.

A typical three-way junction is in the shape of a "Y" and serves to connect three separate duct portions together, each by way of a standard, conventional flexible duct joint. Such a conventional three-way "Y" junction is shown in FIG. 2 of the present application. Notably, junctions for separating or condensing high temperature, pressurized gases must be capable of withstanding the high temperatures and pressures thereof, amongst other stresses. For this reason, conventional junctions like junction 10 are typically made from thicker materials, which cause those junctions to weigh and cost more. Moreover, the junctions inherently require the use of duct joint assemblies at or near the branches of the junctions, which likewise adds considerable weight and costs. In addition, for tension system designs, such duct joint assemblies only provide transverse/bending angulation freedom at each branch leg (i.e., 2 rotational degrees of freedom)—and the bending moment due to friction in the joints does not relieve all of the loads on the junction, thereby causing considerable stresses to still occur. As a result, aircraft ducting systems containing prior art duct junctions are typically designed with high wall thickness to ensure positive stress margins for all applied conditions.

It is desirable to improve the design of duct system junctions by decreasing their overall weight and cost—not only by using thinner materials, but also by minimizing the number of ducting joint assemblies within the system, while still allowing for relative angular, rotational and translational movement between different branches at a duct junction—while eliminating or minimizing stress concentrations at conventional or welded duct junctions. It is also desirable to relieve stresses on the junctions with minimal leakage, while maintaining the tension in the system and preventing fluid forces from being transmitted to the supporting aircraft structures.

SUMMARY OF THE INVENTION

The present disclosure provides a spherical compensator junction assembly for use in a high pressure ducting system for transporting pressurized gases, including but not limited to high temperature pressurized bleed air gases from an aircraft engine, through a pneumatic ducting branch network. The spherical compensator junction assembly comprises a substantially spherical inner race having at least three inner race apertures positioned therewithin, for directing the passage of the gases from at least a first pneumatic duct section positioned upstream of the spherical compensator junction assembly to at least two pneumatic duct sections positioned downstream of the spherical compensator junction assembly. Each of the at least three inner race apertures is surrounded by an outer race, in which each respective outer race is restrainably attached to the substantially spherical inner race about the respective inner race aperture, to define a retention region substantially adjacent to the respective inner race aperture. Each of those retention regions, which is substantially adjacent to each respective inner race aperture and outer race aperture, is configured to receive a retainer assembly about the respective inner race aperture, for translational movement of the retainer assembly relative to both the substantially spherical inner race and the substantially circular outer race, within the respective retention region.

Each of the retainer assemblies includes a retainer aperture therewithin, capable of being generally aligned with one of the respective inner race apertures and positioned over the respective inner race aperture. Each of the retainer assemblies further includes a collar element for affixation to a respective one of the upstream and downstream pneumatic duct sections. The collar element is capable of being attached to the respective duct section, with the collar element defining an upper collar aperture and a lower collar aperture. Each of those upper and lower collar apertures are capable of general alignment with the respective inner race aperture.

In this embodiment, the spherical compensator junction assembly further includes one or more bearing elements positioned within the retention regions between the retainer assembly and one or more of the substantially spherical inner race and the respective outer race.

Each of the retainer assemblies is further capable of cooperating with one or more bearing elements operably positioned within the retention region, to facilitate the translational movement of the retainer assembly within the retention region relative to at least one of the substantially spherical inner race and the outer race, in response to the application of external and internal forces, as well as from forces generated by the high temperature pressurized gases being directed through the spherical compensator junction assembly.

In one embodiment, the spherical compensator junction assembly further comprises one or more sealing elements positioned within each of the retention regions, to seal within the spherical compensator junction assembly the high temperature pressurized gases passing therethrough, as the gases are directed from their entry into one of the collar apertures, through the spherical compensator junction assembly, to exit through another of the collar apertures.

In another embodiment, the at least three inner race apertures comprise three inner race apertures, each of the three inner race apertures having a corresponding retention region and retainer assembly, and the spherical compensator junction assembly further includes three outer races, each of which is positioned adjacent a respective one of the three inner race apertures, to define each of three respective retention regions, within which a respective one of the three retainer assemblies is positioned.

In a different embodiment, the at least three inner race apertures comprise four inner race apertures, each of the four inner race apertures having a corresponding retention region and retainer assembly, and the spherical compensator junction assembly further includes four outer races, each of which is positioned adjacent a respective one of the four inner race apertures, to define each of four respective retention regions, within which a respective one of the four retainer assemblies is positioned.

In yet another embodiment, each of the at least three retainer assemblies includes at least one bottom channel positioned substantially adjacent to the outer surface of the substantially spherical inner race, within the respective retention region, in which the bottom channel maintains at least one of the bearing elements to facilitate the translational movement of the retainer assembly relative to the substantially spherical inner race within the retention region.

In another embodiment, each of the at least three retainer assemblies includes at least one top channel positioned substantially adjacent to the inner surface of the respective outer race, within the respective retention region, in which the top channel maintains at least one of the bearing elements to facilitate the translational movement of the retainer assembly relative to both the substantially spherical inner race and outer race within the retention region.

In another example embodiment, the at least one bottom channel comprises a first bottom channel and a second bottom channel, each of which is positioned substantially adjacent to the outer surface of the substantially spherical inner race, within the respective retention region. In that embodiment, the first bottom channel contains the bearing element and the second bottom channel contains a sealing element, towards maintaining the high temperature pressurized gases within the spherical compensator junction assembly, for directing the gases therewithin to the downstream duct sections with minimal leakage from the spherical compensator junction assembly.

In a yet another example embodiment, the at least one top channel comprises a first top channel and a second top channel, each of which is positioned substantially adjacent to the inner surface of the respective outer race, within the respective retention region. In that embodiment also, the first top channel contains the bearing element and the second top channel contains a sealing element, towards maintaining the high temperature pressurized gases within the spherical compensator junction assembly, for directing the gases therewithin to the downstream duct sections with minimal leakage from the spherical compensator junction assembly.

In a different embodiment, each of the retainer assemblies further includes at least one connector element immediately adjacent to at least one of the upper and lower collar apertures, for restrainably maintaining the position of one of the pneumatic duct sections relative to the collar of a respective retainer assembly.

In another example embodiment, the at least one connector element is operably positioned over and generally aligned with the respective corresponding inner race apertures.

In a further example embodiment, each of the at least one connector elements protrudes through a corresponding aperture in each of the respective outer races.

In a different embodiment, each of the collar elements is capable of being directly affixed to a respective one of the upstream and downstream pneumatic duct sections without a separate duct joint assembly being interpositioned between the respective pneumatic duct section and the spherical compensator junction assembly.

In another embodiment, each of the collar elements is aligned for translational movement within, and operably protrudes through, a corresponding aperture in each of the respective outer races.

In a different embodiment, each of the bearing elements comprises a substantially flat bearing ring. In one embodiment, the substantially flat bearing rings are fabricated from a thermal-resistant, electrically-conductive material, such as graphite or polytetrafluoroethylene, which latter material is more commonly referred to as Teflon.

In yet another embodiment, each of the sealing elements comprises a substantially cylindrical sealing ring. In one embodiment, the substantially cylindrical sealing rings are fabricated from a thermal-resistant material, including but not limited to an elastomeric material.

BRIEF DESCRIPTION OF THE DRAWINGS

The accompanying drawings, which are incorporated herein and form a part of this specification, illustrate embodiments of the invention and, together with the description, serve to explain the principles of the embodiments of the invention.

DETAILED DESCRIPTION OF THE DRAWINGS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Further, to the extent that any numerical values or other specifics of materials, etc., are provided herein, they are to be construed as exemplifications of the inventions herein, and the inventions are not to be considered as limited thereby. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

Figure 1:
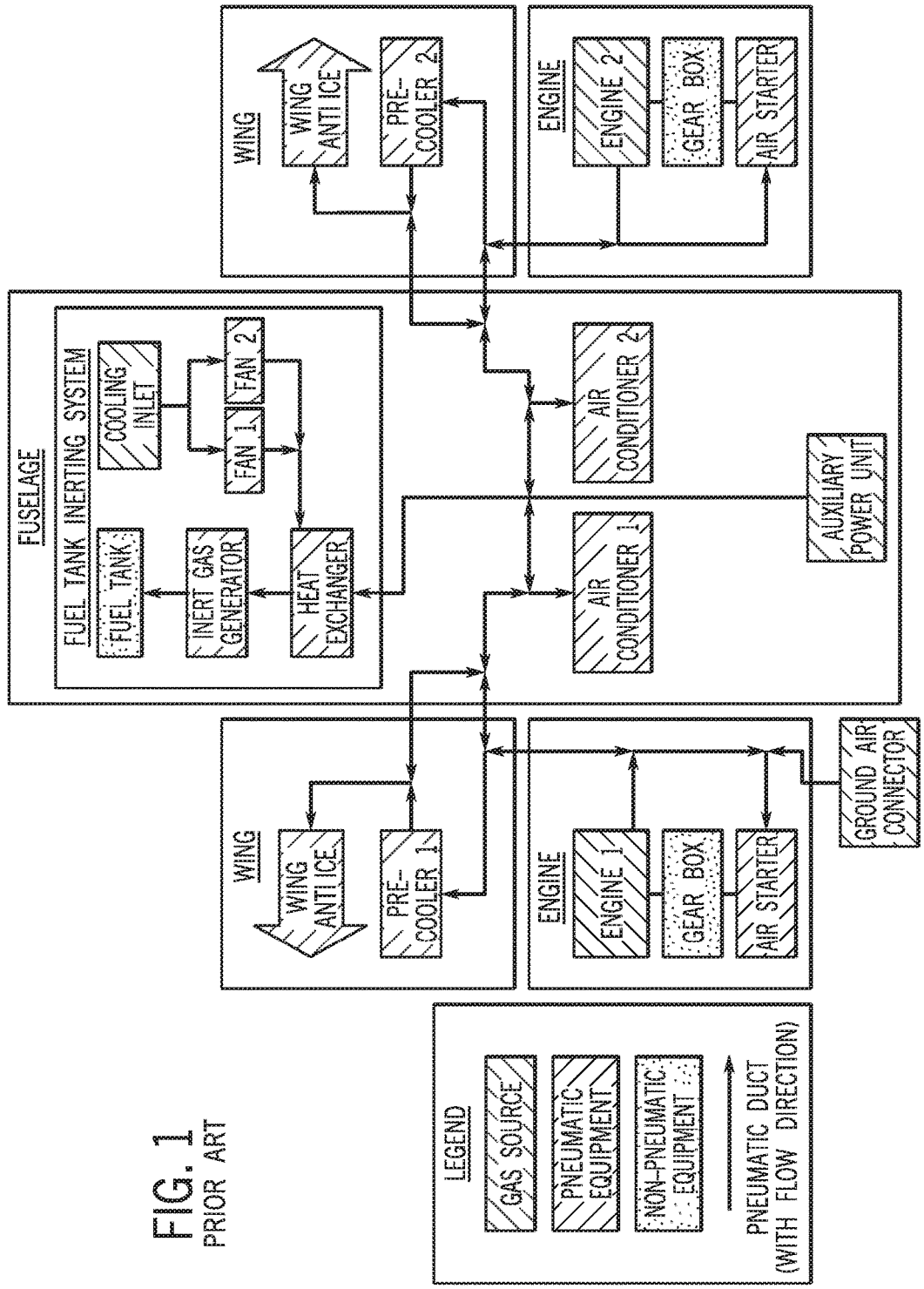
FIG. 1 of the drawings shows a pneumatic duct flow diagram depicting the various components of a prior art pneumatic duct system in an aircraft.

As explained above, the pneumatic ducting system in an aircraft may be used to receive pressurized gases from a variety of sources, including engines, cooling inlets and ground air connectors, among other sources of pressurized gases, and to move such gases around the aircraft for various onboard uses. Such pressurized gases flow through a variety of pneumatic devices, which may add or extract energy from the pressurized gases to perform their function. FIG. 1 shows a simplified, high-level diagram of a ducting system on an aircraft, and depicts common pneumatic aircraft systems for an aircraft with two turbofan engines. Notably, similar architecture will usually apply for single engine and multi-engine aircraft, in both military and commercial contexts. Other specialized pneumatic equipment is often used based on the requirements of the specific aircraft, and is not shown in FIG. 1. Since FIG. 1 is a high-level diagram, smaller pieces of equipment that are typically required for the system to operate effectively are not shown, including, for example, flex joints, control valves and various sensors.

The pneumatic ducts shown in FIG. 1 are often multi-purpose, and allow for the flow of pressurized gases in both directions, as one source of gases can be selected over another for different operating modes of the aircraft. In one example, known amongst the prior art, Engine 1 and Engine 2 may be started using pressurized or compressed gases from a gas source, such as the Auxiliary Power Unit or the Ground Air Connector. Once either Engine 1 or Engine 2 has started, that operating engine may become a third potential gas source, which can then be used to start the other, non-operating engine. The pressurized hot air drawn from the aircraft engine's compressor stages is often referred to as "bleed air," and may be routed throughout an aircraft using the pneumatic ducting system shown in FIG. 1. For example, such bleed air may be used to start additional engines, pressurize the cabin, or de-ice the wings, nacelles, and empennage.

As another example, during mid-flight, both engines are running and providing approximately equal amounts of engine bleed air to the ducting system. In that case, the pressurized gases may be directed to the Fuel Tank Inerting System (FTIS), sometimes referred to as the On Board Inert Gas Generating System (OBIGGS). The purpose of such systems is to direct the bleed air from the engines through a heat exchanger, to cool the bleed air to an appropriate temperature for the Inert Gas Generator to function. The source of cold air for the heat exchanger is from outside the aircraft. The Inert Gas Generator extracts oxygen from the air, thus making it inert, and feeds this inert gas to the fuel tank(s). At the same time, engine bleed air is directed through Pre-Coolers 1 and 2 to cool the gases flowing into the Air Conditioners. The Air Conditioners may then be used to further cool the gases to a temperature that is acceptable for use in the passenger cabin temperature control system. Notably, every three-way junction shown in FIG. 1 represents an opportunity for using the inventive spherical compensator junction assembly disclosed herein.

Figure 2:
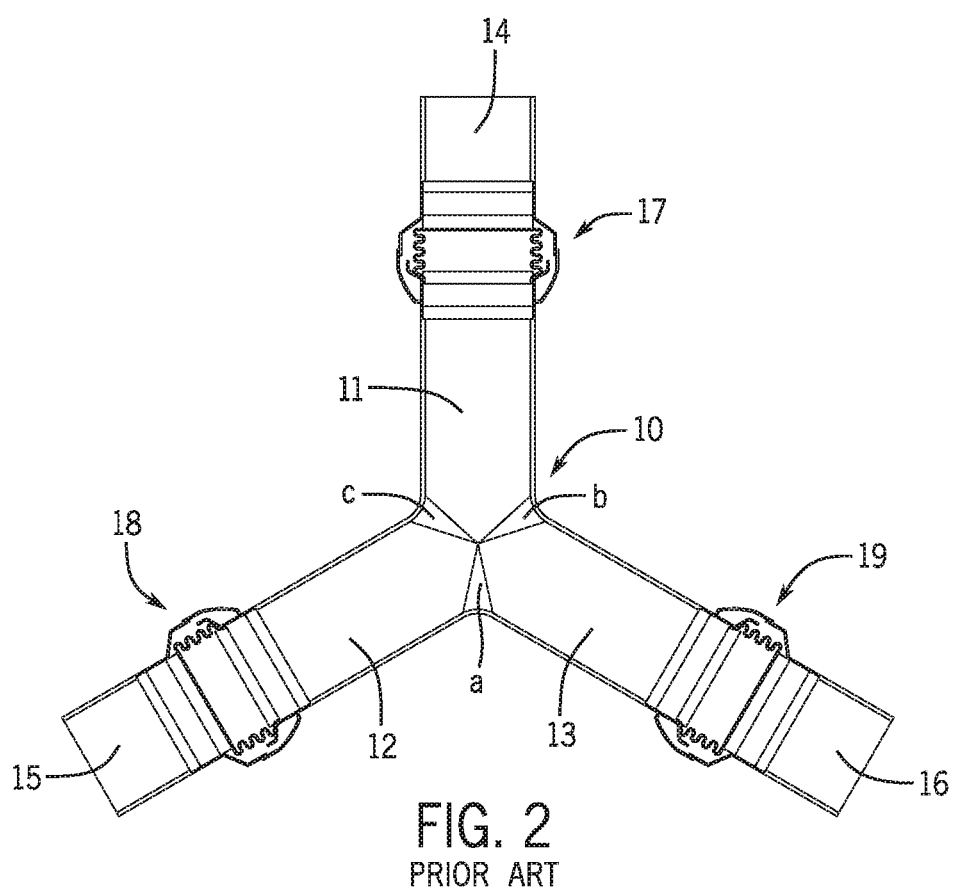
FIG. 2 of the drawings shows top plan view of a prior art duct system junction with corresponding conventional flex joints.

Prior art Y-junction 10 is shown in FIG. 2, comprising three separate integrated branches 11, 12 and 13—all three of which converge at the center of the junction 10. At the center, prior art junction 10 includes several filleted regions a, b and c, which are exposed to forces and stresses caused by the flow of pressurized gases through junction 10, as well as external forces. In turn, each of branches 11, 12 and 13 is connected to, and interfaces with, a corresponding duct portion 14, 15 and 16, respectively. To compensate for motions caused by vibration, heat expansion, and any other displacements amongst the plurality of duct sections, each branch of junction 10—branches 11, 12 and 13—is connected to the respective duct portions 14, 15 and 16 by way of a respective bellows-type duct joint 17, 18 and 19. The bellows-type joints are well known in the prior art, and are described, for example, in SAE ARP 699.

As explained above, junction 10 may be used to separate and redirect the bleed air from upstream duct portion 14 into two other downstream duct portions 15 and 16. For example, upstream duct portion 14 may be positioned near the aircraft engines where the bleed air is captured, and downstream duct portions 15 and 16 may carry that bleed air to different locations within the aircraft, for use by the various systems described above. Conversely, junction 10 may also be used to combine the bleed air from the two upstream duct portions 15 and 16 into single downstream duct portion 14. In that example, upstream duct portions 15 and 16 may each be positioned near one or more aircraft engines, to thereby capture bleed air within those two duct portions—and upstream duct portions 15 and 16 may converge in junction 10 to accumulate the bleed air in a central location, before distributing it throughout the aircraft. Accordingly, the bleed air may be separated or combined, depending upon the requirements of the particular design, for directional flow of the bleed air through the system, as desired.

Figure 3:
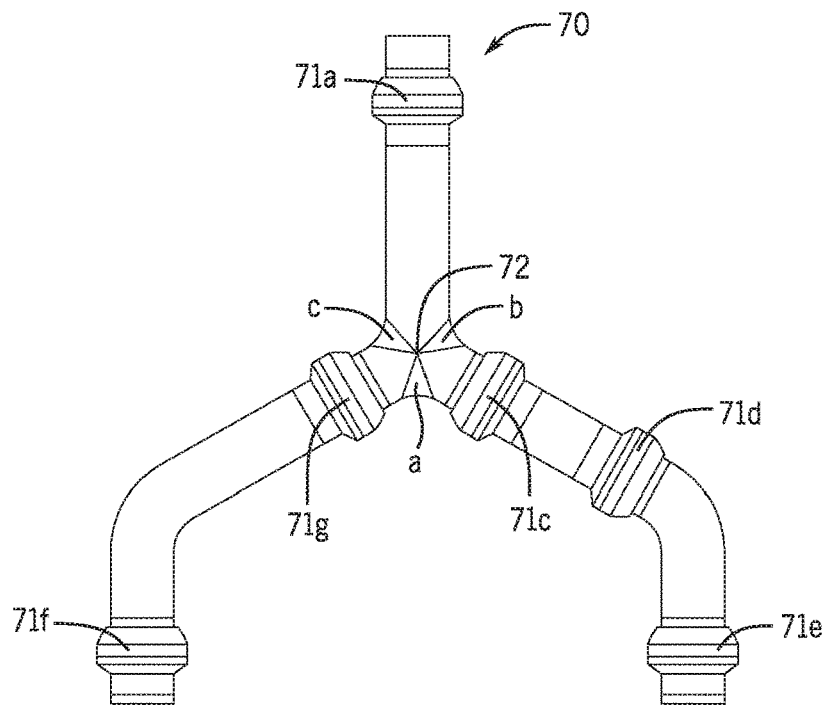
FIG. 3 of the drawings shows a top plan view of another prior art three-way "Y" junction, showing the branches of that junction connecting to and interfacing with other duct portions, using a number of duct joints to compensate for system loads.

FIG. 3 shows another prior art Y-junction 72 as part of a larger duct system 70, to demonstrate how conventional junctions may include several duct joints, to compensate for the stresses arising from the pressurized gases. As shown in FIG. 2, conventional junction 72 includes filleted regions a, b and c, in which junction 72 itself may be connected to surrounding duct sections via duct joints 71c and 71g. Overall duct system 70 may also include additional duct joints 71a, 71d, 71e and 71f. Notably, each of duct joints 71a-f as well as filleted regions a, b and c comprises a region where the duct system could potentially fail, causing a dangerous leak of pressurized gases. FIG. 3 will be referred to again later, to enable a comparison between such conventional duct junctions and the inventive compensator junction disclosed herein.

Figure 4:
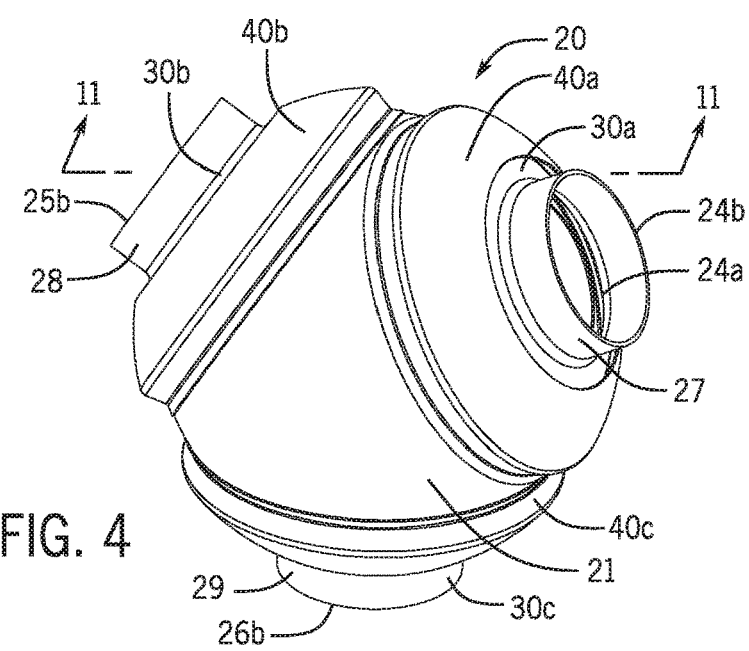
FIG. 4 of the drawings shows a perspective view of the present spherical compensator junction assembly having three branches capable of connecting to, and interfacing with, three separate duct portions (shown in FIG. 13).

FIG. 4 shows fully assembled compensator junction 20, having a spherical inner race 21, three outer races 40a, 40b, 40c and three retainer assemblies 30a, 30b, 30c. In this preferred embodiment of the invention, compensator junction 20 is configured as a replacement for the prior art Y-junction 10 shown in FIGS. 2 and 3. Spherical inner race 21 contains three apertures (which apertures are shown more clearly in FIG. 6), over which outer races 40a, 40b, 40c are operably positioned and affixed, such as by welding, thus forming a retention region in between spherical inner race 21 and each respective set of outer races 40a, 40b, 40c. Positioned within each retention region are retainer assemblies 30a, 30b, 30c, respectively. Thus, the apertures within inner race 21 are operably aligned with retainer assemblies 30a, 30b, 30c and outer races 40a, 40b, 40c, respectively, to permit the flow of gases to be inputted from collar 28 into inner race 21, and outwards and through the branches affixed to collars 27 and 29. Each collar includes an upper collar aperture and a lower collar aperture (not all shown in FIG. 4). For example, as can be seen in FIG. 4, collar 27 includes lower collar aperture 24a and upper collar aperture 24b.

It should be understood that additional branches are possible depending on the requirements and overall layout of a given ducting system. The branch should be capable of collectively compensating for three (3) rotational degrees of freedom (transverse/bending and torsional angulation), while retaining a tension system design. The particular branches are not shown in FIG. 4 as being connected to compensator junction 20. However, the branches would typically be affixed using traditional methods to retainer assemblies 30a, 30b and 30c. More specifically, a duct portion (not shown in FIG. 4) intended for affixation to junction 20 may be affixed to collar 27, using traditional methods, including welding or brazing. The contact point between such duct portion and collar 27 may be located between lower collar aperture 24a and upper collar aperture 24b.

Figure 5:
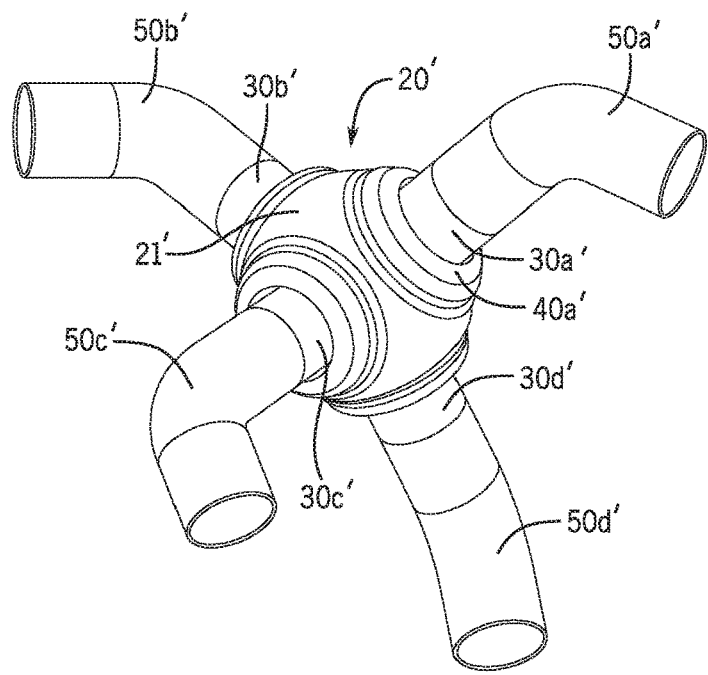
FIG. 5 of the drawings shows a perspective view of a spherical compensator junction assembly having four branches capable of connecting to, and interfacing with, four separate duct portions, each branching off in a different direction.

One example showing such branches incorporated within, and affixed to, the inventive compensator junction is shown in FIG. 5. There, the assembled compensator junction 20' incorporates four branches 50a', 50b', 50c' and 50d'. In this embodiment, compensator junction 20' comprises spherical inner race 21', together with four retainer assemblies 30a', 30b', 30c' and 30d'. While it is not possible to see all of the outer races from this perspective, outer race 40a' can be seen positioned over spherical inner race 21', on top of retainer 30a'. In this embodiment also, duct sections 50a', 50b', 50c' and 50d' are affixed to corresponding retainers 30a', 30b', 30c' and 30d', so that the apertures within inner race 21' are in alignment with the apertures within the outer races, including outer race 40a', as well as with retainers 30a', 30b', 30c' and 30d'. This alignment permits gases to flow from one of the duct sections, such as duct section 50b', into inner race 21', and then outwards and through the three remaining duct sections 50a', 50c' and 50d', or as the ducting system may otherwise require.

While the embodiments shown herein reflect a spherical compensator junction having three apertures, for connection with three duct sections (as shown, for example, in FIG. 4), and a spherical compensator junction having four apertures, for connection with four duct sections (as shown, for example, in FIG. 5), one of skill in the art will readily appreciate that the inventive compensator junction disclosed herein is capable of incorporating more than four apertures and branches, for directing gases in five, six, or seven different directions—or however many directions the needs of the system may require. As one of skill in the art will recognize, the inventive spherical compensator junction may be modified to accommodate any number of branches or conduits (together with any corresponding number of apertures, outer races and retainers) to enable such a ducting system design. Of course, a larger number of apertures and branches may require that the overall size of the spherical compensator and the inner race be increased, to accommodate the size of additional retainer assemblies and outer race structures.

Figure 6:
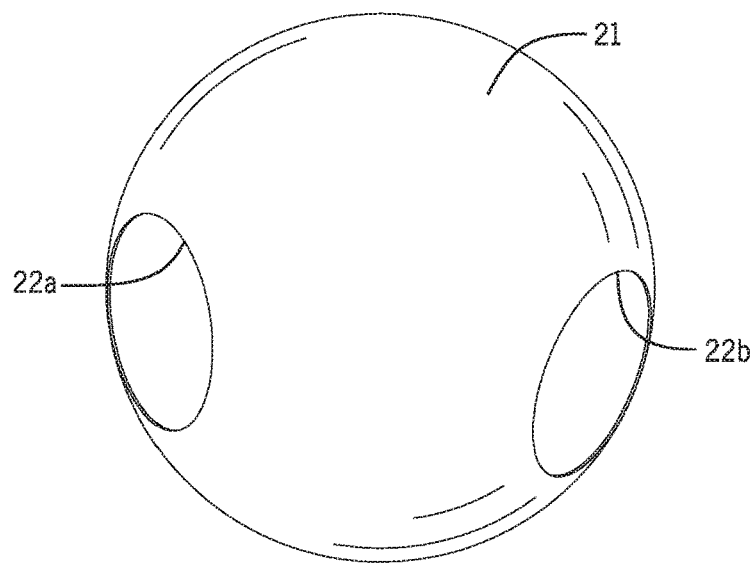
FIG. 6 of the drawings is a perspective view of the present invention showing an inner race component, with two exposed inner race apertures.

FIG. 6 shows inner race 21, which may be manufactured from sheet or plate metal, as is known in the industry. Preferably, it is formed of two halves butt welded together, with the external weld surface being sufficiently polished to maintain a spherical profile. The halves can then be die-pressed (or can undergo a similar process), or hydroformed into a spherical shape. As shown in FIG. 6, inner race 21 comprises three apertures, including aperture 22a and aperture 22b. In FIG. 6, aperture 22c is not visible, as it would be positioned in the back of inner race 21 and would not be seen from this viewpoint. Apertures 22a, 22b and 22c may be positioned at equal distances around inner race 21. For example, in the case of a three-way compensator junction shown in FIGS. 4 and 5, apertures 22a, 22b and 22c may be positioned 120 degrees apart, along the central equator of inner race 21. Apertures 22a, 22b and 22c in inner race 21 may be cut or carved out of inner race by way of known processes, such as laser or plasma cutting.

Figure 7:
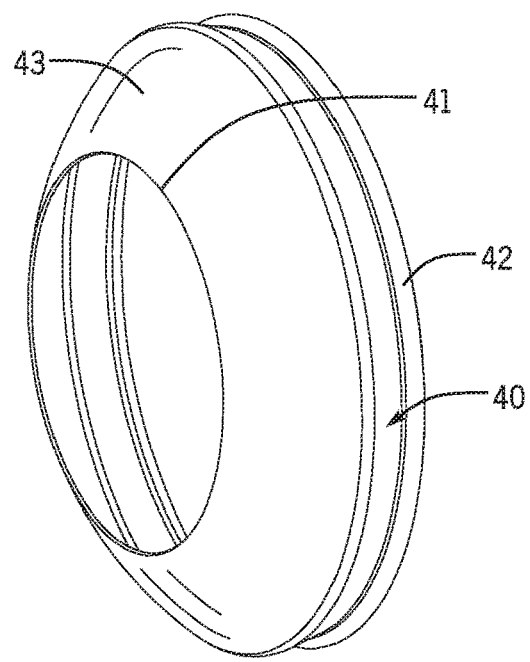
FIG. 7 of the drawings is a perspective view of an outer race component of the present invention which can be welded about each of the inner race apertures to create a series of retention regions.

Outer race 40 is shown in FIG. 7. Outer race 40 is preferably dome-shaped, and comprises bottom flange 42 and top portion 43. The top of the dome, at top portion 43, includes aperture 41 for general alignment with, and telescopic receipt of, collars 27, 28 or 29 (shown in FIG. 4). As with inner race 21, outer race 40 may be manufactured out of sheet or plate metal. After aperture 41 is pre-cut into outer race 40, with proper sizing by methods well-known in the industry, outer race 40 may be spin-formed, die-pressed (or can undergo a similar process), or hydroformed into its final shape. Bottom flange 42 of outer race 40 is substantially circular in shape, and is curved to substantially match the curvature of inner race 21, over which outer race 40 will be positioned and affixed, using known methods, such as welding. Finally, top portion 43 of outer race 40 has a substantially arcuate curvature, which may also match the curvature of inner race 21. When outer race 40 is positioned over one of the apertures in inner race 21, and is affixed to inner race 21, it creates a retention region between inner race 21 and outer race 40. This is the retention region within which retainer assembly 30 will be movably positioned.

Figure 8:
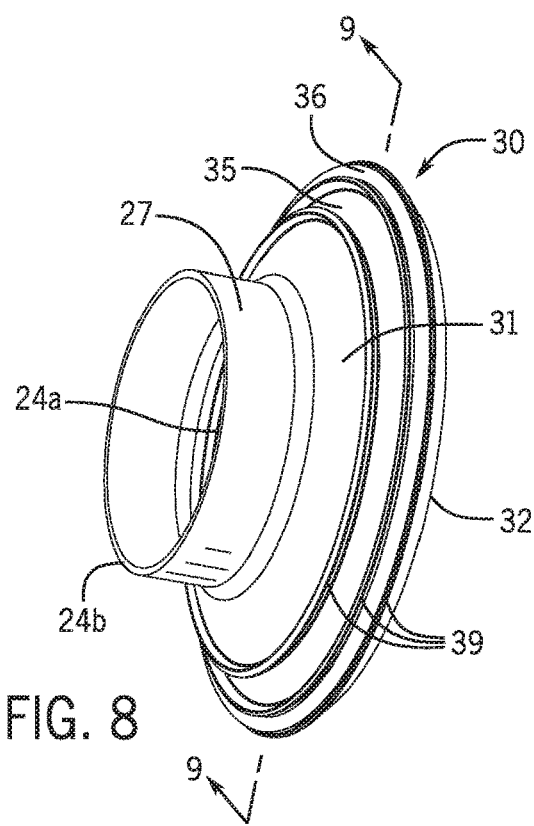
FIG. 8 of the drawings is a perspective view of a retainer component of the present invention which is located for sliding rotational movement about the center of the inner race, within each of the retention regions.

FIG. 8 shows retainer assembly 30. Protruding from the top of retainer 30 is collar 27, which includes lower collar aperture 24a and upper collar aperture 24b. Collar 27 serves as an attachment member for affixing retainer assembly 30 to a duct portion (not shown in FIG. 8), for carrying gases towards, or away from, the inventive spherical compensator junction. Like inner race 21 and outer race 40, retainer assembly 30 can also be manufactured from sheet or plate metal, such as stainless steel. When inner race 21, outer race 40 and retainer assembly 30 are assembled to form a portion of spherical compensator 20, collar 27 will be positioned over aperture 22a in inner race 21, and inserted through aperture 41 in outer race 40. As such, retainer assembly 30 will be positioned in such a way that collar 27 points outwardly away from the interior of inner race 21. Retainer 30 may be machined into the required shaped, or it may alternatively be spin-formed or die-pressed, with additional channels welded or otherwise affixed to retainer 30 for receipt of bearings and seals, as will be described below.

It should be understood that inner race 21, outer race 40 and retainer 30 may be made out of any structural material that will not degrade in the intended environment and for the intended use. However, it is preferred that materials with high specific strength, and good fabrication and formability characteristics, be utilized (e.g. CRES 321, Inconel 625, Titanium CP70, etc.). Further, not all parts of the invention, are required to be made out of the same metal. Particular attention should be paid, however, that parts that may be bonded together should be fabricated from compatible metals and materials.

Figure 12:
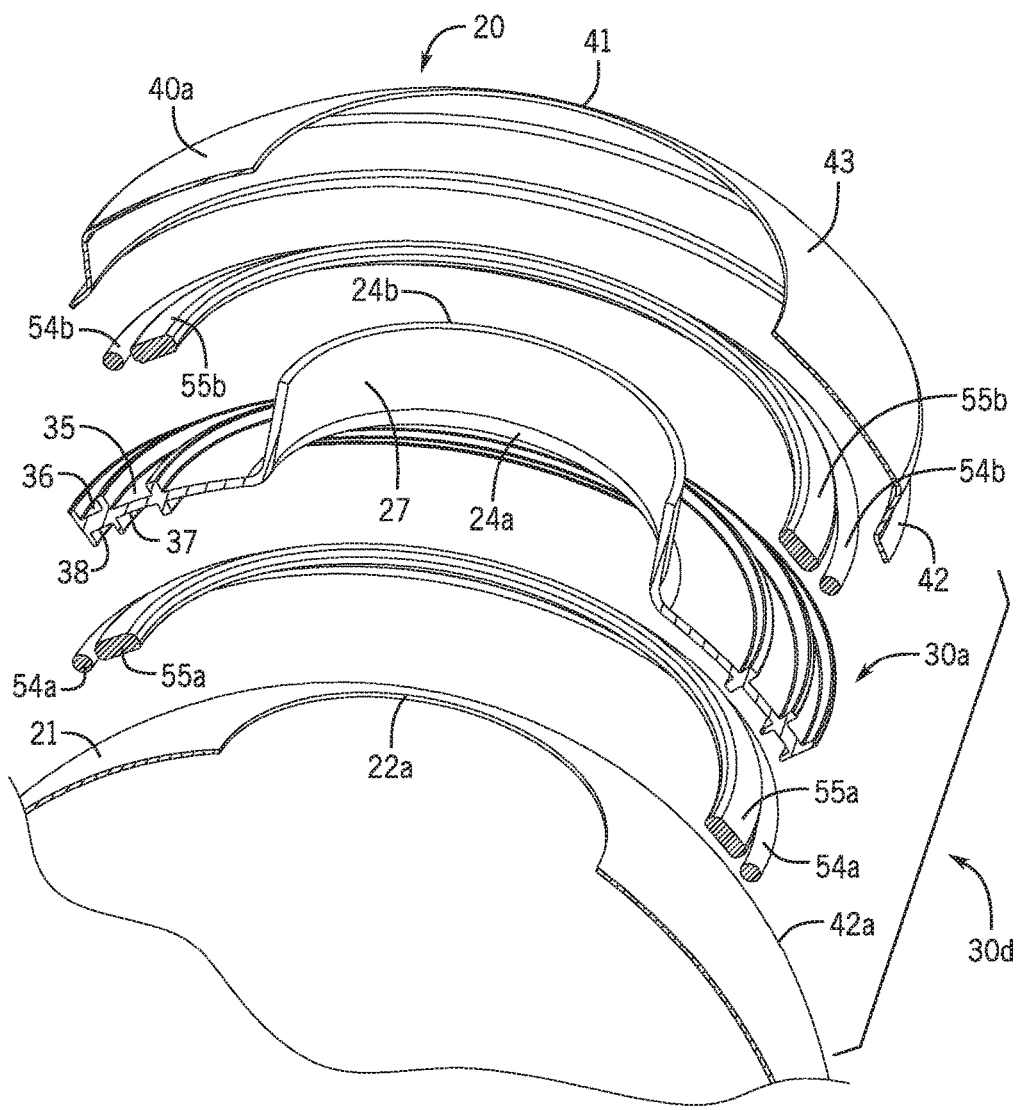
FIG. 12 of the drawings is an exploded, cross-sectional view of a portion of the invention of FIG. 10, illustrating the various components of the claimed invention.

As shown in FIG. 8, and as depicted more clearly in FIG. 12, each retainer assembly 30 preferably includes at least one channel in top surface 31 and at least one channel in bottom surface 32, for receipt of bearings and seals. Bearings serve to permit an appropriate level of movement and angulation of retainer assembly 30, which is sandwiched between inner race 21 and outer race 40. Seals serve to minimize leakage of gases in any gaps that may exist between inner race 21 and retainer assembly 30, and or between retainer assembly 30 and outer race 40. Whether each channel receives only a bearing, only a seal, or a combination of bearings and seals, is left for the particular intended application. Each of the bearings may be fabricated from a thermal-resistant and electrically conductive material, such as graphite or polytetrafluoroethylene. Further, each of the seals may be fabricated from a thermal-resistant material, such as a thermal-resistant elastomeric material.

Figure 9:
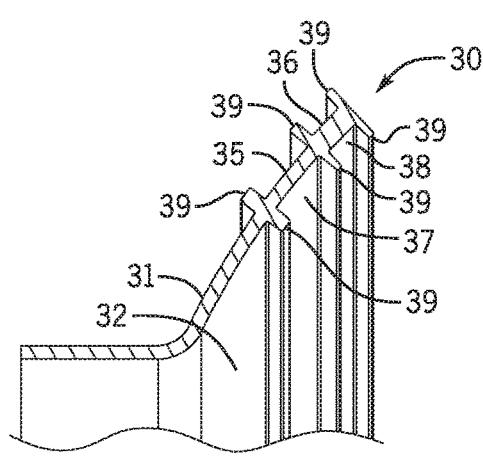
FIG. 9 of the drawings is an elevated cross-sectional view of one embodiment of the channels of the retainer component shown in FIG. 8, taken along lines 9-9 and looking in the direction of the arrows, wherein each channel can contain a conductive bearing (sliding surface), for enabling movement, by way of spherical rotation, to collectively accommodate angulation and/or rotation, and a seal, for minimizing the leakage of gases passing therethrough.

In one embodiment shown in FIGS. 8, 9 and 12, two channels 35 and 36 are located on top surface 31 of retainer 30, and two channels 37 and 38 are located on bottom surface 32 of retainer 30. Each of channels 35, 36, 37 and 38 are formed by being positioned in between raised ridges 39. Top channels 35 and 36 and bottom channels 37 and 38 may be arranged in various ways, and formed in various sizes, depending upon the nature of the use and the particular design needs of the system, including the intended sizes of the bearings and seals to be positioned for use within the channels. As arranged in FIG. 9, top channels 35 and 36 are arranged for receipt of one bearing in channel 35 and one seal in channel 36. Similarly, bottom channels 37 and 38 are arranged for one bearing in channel 37 and one seal in channel 38.

Figure 10:
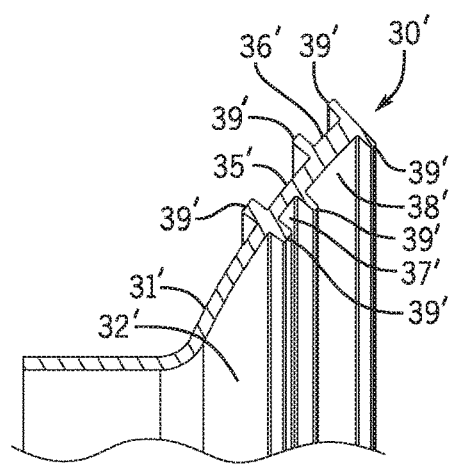
FIG. 10 of the drawings is a cross-sectional view of an alternative configuration of the channel arrangement for the retainer component of FIG. 8, in which the seal ring on the bottom of the retainer component is oriented radially inwardly of the bearing ring.

Another embodiment is shown in FIG. 10, which depicts an alternative design arrangement of channel locations on retainer 30'. In this embodiment, channels 35', 36', 37' and 38' are arranged so as to alternate the relative positions of bearings and seals. Specifically, top channel 35' and bottom channel 38' are designed to receive a respective bearing, while top channel 36' and bottom channel 37' are designed to receive a respective seal.

Figure 11:
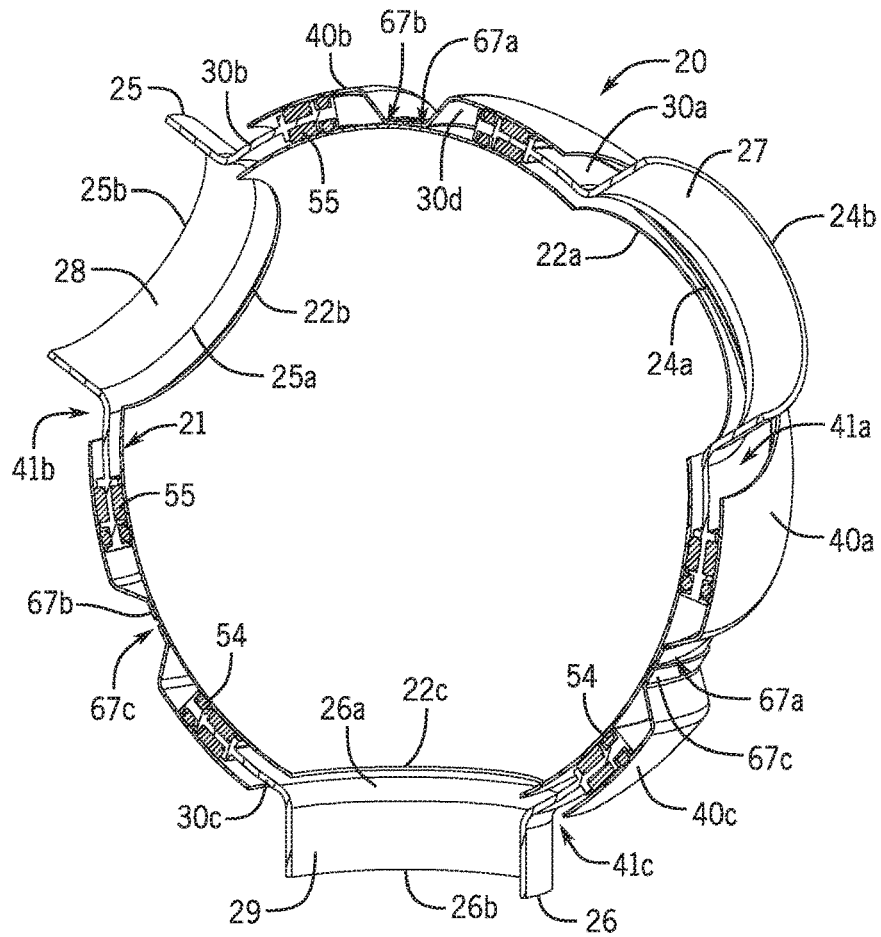
FIG. 11 of the drawings is a cross-sectional perspective view of the invention of FIG. 4, taken along lines 11-11 and looking in the direction of the arrows, illustrating the orientation and operation of the inner and outer components of the claimed invention.

A fully assembled, three branch embodiment of compensator junction 10 is shown in cross-section in FIG. 11. Retainers 30a, 30b, and 30c, are operably positioned above apertures 22a, 22b and 22c within inner race 21—so that collars 27, 28 and 29, respectively, are aligned with apertures 22a, 22b and 22c, respectively. Outer races 40a, 40b, 40c are positioned over corresponding retainers 30a, 30b, 30c, so that collars 27, 28 and 29 extend in and through apertures 41a, 41b, 41c, respectively, to permit attachment of branches of the duct system to collars 27, 28 and 29. Specifically, a duct branch will be affixed to collars 27, 28 and 29 in between lower collar apertures 24a, 25a and 26a and upper collar apertures 24b, 25b and 26b, respectively. Again, collars 27, 28 and 29 may be affixed to the branches using any manner known in the art, including welding or brazing.

The relative positions of inner race 21, retainers 30a, 30b and 30c, and outer races 40a, 40b and 40c are maintained by attaching bottom edges 67a, 67b and 67c of each respective outer race 40a, 40b and 40c to inner race 21. This attachment of inner race 21 to outer races 40a, 40b and 40c may be accomplished through fillet welding or other suitable manner well known in the art. Retainer assemblies 30a, 30b and 30c are maintained within the retention regions, such as retention region 30d, for retainer assembly 30a, formed between each respective outer race 40a, 40b and 40c and inner race 21.

FIG. 11 also depicts various seals 54, which serve to minimize leakage, and various conductive bearings 55, which serve as sliding surfaces that enable compensator junction 10 to move, to thereby withstand the stresses and angulation or rotation caused by the highly pressurized gases and external forces.

FIG. 12 is an exploded cross-sectional view of the layers of compensator junction 10, for only one portion of inner race 21, one retainer assembly 30a and one outer race 40a, when the junction is assembled. As can be seen, the innermost layer is spherically shaped inner race 21. On top of that innermost layer, retainer assembly 30a is positioned within retention region 30d formed between inner race 21 and outer race 40a. Retainer 30a comprises bottom channels 37 and 38 and top channels 35 and 36.

As mentioned, top channels 35 and 36 and bottom channels 37 and 38 contain layers of bearings and/or seals. The bearings serve as sliding surfaces to enable rotation, angulation and other movements between inner race 21 and retainer assembly 30a, and between retainer assembly 30a and outer race 40a, respectively, to enable the spherically rotational movement. The seals serve to minimize leakage of the gases between inner race 21 and retainer assembly 30a, and between retainer assembly 30a and outer race 40a, respectively. In this embodiment, bottom channels 37 and 38 respectively contain bottom bearing 55a and bottom seal 54a, while top channels 35 and 36 respectively contain top seal 54b and top bearing 55b. Seals 54a and 54b serve to minimize leakage. Moreover, both flat-shaped bearings 55a and 55b and cylindrical-shaped seals 54a and 54b are each fabricated from a thermal-resistant material. In particular, flat-shaped bearings 55a and 55b are fabricated from a thermal-resistant, electrically conductive material, whereas cylindrical-shaped seals 54a and 54b may be (but need not be) fabricated from an elastomeric material.

Retainer assembly 30a is positioned over aperture 22a so that lower aperture 24a and upper aperture 24b are aligned over aperture 22a. Outer race 40a is positioned and affixed over retainer assembly 30a, so that collar 27 extends through aperture 41.

Figure 13:
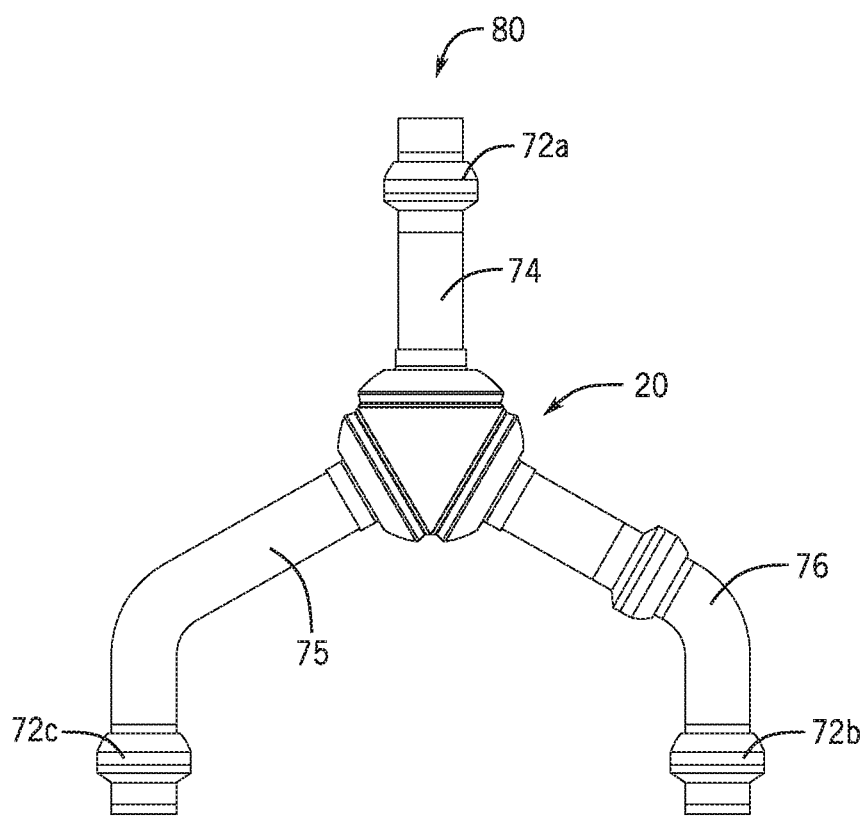
FIG. 13 of the drawings is a top plan view of the invention, showing the invention integrated into a high pressure ducting system for transporting high temperature, pressurized gases, here, through a three-branch ducting network.

FIG. 13 serves to provide a comparison between an embodiment of the inventive three-way spherical compensator junction 20, shown in FIG. 13, and a three-way prior art junction 72 shown in FIG. 3. As can be seen, prior art junction 72 in FIG. 3 requires numerous duct joints—including at least one such joint connected to each and every branch of the prior art Y-junction, namely, joints 71c and 71g, as well as other duct joints within overall duct system 70, namely, joints 71a, 71d, 71e and 71g.

In FIG. 13, however, inventive spherical compensator 20 can be directly affixed to each of duct portions 74, 75 and 76, and thus inventive spherical compensator 20 minimizes the need for using conventional duct joints to connect the branches to duct portions. Thus, the inventive spherical compensator serves to minimize the number of duct joints, and further minimizes the amount of materials used in thick and heavy conventional junctions—leading to cost savings and weight savings, both important considerations in modern aircraft—while imparting effective degrees of translation to accommodate angular displacement and slippage in all three directions. As one of skill in the art would recognize, inventive spherical compensator 20 provides better compensation, by reducing interface stresses and bending loads, compared with three-way prior art junction 72. Moreover, in some embodiments, inventive spherical compensator 20 may be able to fit in smaller spaces than conventional junction 72. Inventive spherical compensator 20 is also more cost effective and less complicated than conventional junction 72.

The embodiments disclosed herein are exemplary in nature and are not intended to restrict the scope of the invention. Alternate materials, methods of securing the various parts on the invention, and different configurations for the inner race, the spherical compensator junction, the retainers and the outer race are contemplated as being within the scope of the invention.

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A spherical compensator junction assembly for use in a high pressure ducting system for transporting pressurized gases through a pneumatic ducting gas branch network, the spherical compensator junction assembly comprising:

a substantially spherical inner race having at least three inner race apertures positioned therewithin to direct the passage of said gases from at least a first pneumatic duct section positioned upstream of said spherical compensator junction assembly to at least two pneumatic duct sections positioned downstream of said spherical compensator junction assembly;

each of said at least three inner race apertures being surrounded by a single, dedicated respective outer race, each of said respective outer races being restrainably and independently attached to said substantially spherical inner race about said respective inner race aperture to describe a single, dedicated retention region substantially adjacent to each of said respective inner race apertures;

each of said at least three dedicated retention regions substantially adjacent to each said respective inner race aperture configured to receive a single, dedicated retainer assembly about said respective inner race aperture, for angular and translational movement relative to both said substantially spherical inner race and said respective dedicated outer races, within said retention region to enable the three dimensional articulation of the assembly, each of said at least three retainer assemblies including a retainer aperture therewithin capable of being generally aligned with a respective one of said respective inner race apertures and positioned thereover said respective inner race aperture, each said retainer assembly further including a collar element for affixation to a respective one of said upstream and downstream pneumatic duct sections, said collar element capable of being attached to said respective pneumatic duct section, said collar element defining an upper collar aperture and a lower collar aperture, each of said upper and lower collar apertures being capable of general alignment with said respective inner race aperture, one or more bearing elements positioned within said respective retention region positioned between each of said retainer assemblies and at least one of said substantially spherical inner race and said respective outer races, to enable the three dimensional articulation of the assembly, each of said retainer assemblies further capable of cooperating with said one or more bearing elements operably positioned within said retention region to facilitate the spherically rotational movement of said retainer assembly within said retention region relative to at least one of said respective substantially spherical inner race and said respective outer race, in response to the application of external and internal forces and temperatures, as applied to one or more of said upstream and downstream duct sections, as said pressurized gases are directed through said spherical compensator junction assembly.

2. The spherical compensator junction assembly according to claim 1, in which said spherical compensator junction assembly is configured for transporting high temperature pressurized gases through said pneumatic ducting gas branch network.

3. The spherical compensator junction assembly according to claim 2, in which said high temperature, pressurized gases comprise hot compressed bleed air from the engine of an aircraft.

4. The spherical compensator junction assembly according to claim 1, in which said spherical compensator junction assembly is configured for transporting pressurized gases from a ground air connector operably connected to the engine of an aircraft.

5. The spherical compensator junction assembly according to claim 1, in which said spherical compensator junction assembly is configured for transporting hot compressed bleed air from the engine of an aircraft to a cooling inlet of an inert gas generating system.

6. The spherical compensator junction assembly according to claim 1, further comprising one or more sealing elements positioned within each of said retention regions, to seal within said spherical compensator junction assembly the pressurized gases passing therethrough, as said gases are directed from entry into one of said collar apertures, through said spherical compensator junction assembly, to exit through another of said collar apertures.

7. The spherical compensator junction assembly according to claim 6, in which each of said sealing elements comprises a substantially cylindrical sealing ring.

8. The spherical compensator junction assembly according to claim 7, in which each of said substantially cylindrical sealing rings is fabricated from a thermal-resistant elastomeric material.

9. The spherical compensator junction assembly according to claim 7, in which each of said substantially cylindrical sealing rings is fabricated from a thermal-resistant metallic material.

10. The spherical compensator junction assembly according to claim 1, in which said at least three inner race apertures comprises no more than three inner race apertures, each of said three inner race apertures having a corresponding retention region and retainer assembly, said spherical compensator junction assembly further including no more than three outer races, each of which is positioned adjacent to a respective one of said three inner ace apertures to define each of three respective retention regions, within which a respective one of said three retainer assemblies is positioned.

11. The spherical compensator junction assembly according to claim 1, in which said at least three inner race apertures comprises four inner race apertures, each of said four inner race apertures having a corresponding retention region and retainer assembly, said spherical compensator junction assembly further including four outer races, each of which is positioned adjacent to a respective one of said four inner race apertures to define each of four respective retention regions, within which a respective one of said four retainer assemblies is positioned.

12. The spherical compensator junction assembly according to claim 1, in which each of said at least three retainer assemblies includes at least one bottom channel positioned substantially adjacent to the outer surface of said substantially spherical inner race, within said respective retention region, said bottom channel maintaining at least one of said bearing elements to facilitate said spherically rotational movement of said retainer assembly relative to said substantially spherical inner race, within said retention region.

13. The spherical compensator junction assembly according to claim 12, in which said at least one bottom channel comprises a first bottom channel and a second bottom channel, each of which is positioned substantially adjacent to the outer surface of said substantially spherical inner race, within said respective retention region, said first bottom channel containing said bearing element and said second bottom channel maintaining a sealing element, towards maintaining said high temperature pressurized gases within said spherical compensator junction assembly, for directing said gases therewithin to said downstream duct sections with minimal leakage from said spherical compensator junction assembly.

14. The spherical compensator junction assembly according to claim 1, in which each of said at least three retainer assemblies includes at least one top channel positioned substantially adjacent to the inner surface of said respective outer race, within said respective retention region, said top channel maintaining at least one of said bearing elements to facilitate said spherically rotational movement of said retainer assembly relative to said substantially spherical inner race, within said retention region.

15. The spherical compensator junction assembly according to claim 14, in which said at least one top channel comprises a first top channel and a second top channel, each of which is positioned substantially adjacent to the inner surface of said respective outer race, within said respective retention region, said first top channel containing said bearing element and said second top channel maintaining a sealing element, towards maintaining said high temperature pressurized gases within said spherical compensator junction assembly, for directing said gases therewithin to said downstream duct sections with minimal leakage from said spherical compensator junction assembly.

16. The compensator junction assembly according to claim 1, in which each of said retainer assemblies further includes at least one connector element immediately adjacent to said collar aperture for restrainably maintaining the position of one of said pneumatic duct sections relative to a respective retainer assembly.

17. The spherical compensator junction assembly according to claim 16, in which said at least one connector element is operably positioned over and aligned with said respective corresponding inner race apertures.

18. The spherical compensator junction assembly according to claim 17, in which each of said at least one connector elements protrudes through a corresponding aperture in each of said respective outer races.

19. The spherical compensator junction assembly according to claim 1, in which each of said at least three collar elements is capable of being directly affixed to a respective one of said upstream and downstream pneumatic duct sections without a separate duct joint assembly being positioned between said respective pneumatic duct section and said spherical compensator junction assembly.

20. The spherical compensator junction assembly according to claim 19, in which each of said collar elements is aligned for spherically rotational movement within, and operably protrudes through, a corresponding aperture in each of said respective outer races.

21. The spherical compensator junction assembly according to claim 1, in which each of said bearing elements comprises a substantially flat bearing ring.

22. The spherical compensator junction assembly according to claim 21, in which each of said substantially flat bearing rings is fabricated from a thermal-resistant, electrically conductive material.

23. The spherical compensator junction assembly according to claim 22, in which each of said substantially flat bearing rings is fabricated from graphite.

24. The spherical compensator junction assembly according to claim 22, in which each of said substantially flat bearing rings is fabricated from polytetrafluoroethylene.

25. The spherical compensator junction assembly according to claim 1, in which said first pneumatic duct section positioned upstream of said spherical compensator junction assembly is positioned downstream of an aircraft engine, wherein said high temperature pressurized gases comprise high temperature bleed air gases emanating from said aircraft engine, and wherein said spherical compensator junction assembly is positioned and configured to distribute said bleed air gases to said at least two pneumatic duct sections positioned downstream of said spherical compensator junction assembly.

26. The spherical compensator junction assembly according to claim 1, in which said spherical compensator junction assembly is positioned upstream of an aircraft engine, wherein said spherical compensator junction assembly is positioned and configured to distribute said pressurized gases from a gas source upstream of said spherical compensator junction assembly through at least one pneumatic duct section positioned downstream of said spherical compensator junction assembly, towards distributing said gases to said aircraft engine, to enable starting said aircraft engine.

* * * * *